United States Patent [19]

Bahlmann et al.

[11] Patent Number: 5,031,196

[45] Date of Patent: Jul. 9, 1991

[54] RECEIVER FOR USE IN A REMOTE CONTROL SYSTEM

[75] Inventors: Johannes P. M. Bahlmann; Johannes P. M. Inghels, both of Eindhoven, Netherlands

[73] Assignee: U. S. Philips Corporation, New York, N.Y.

[21] Appl. No.: 414,566

[22] Filed: Sep. 29, 1989

[30] Foreign Application Priority Data

Oct. 17, 1988 [NL] Netherlands .......................... 8802544

[51] Int. Cl.[5] .......................... H03D 1/00; H04L 27/06
[52] U.S. Cl. ........................................ 375/94; 455/619
[58] Field of Search ............................. 375/75, 76, 94; 455/606, 608, 609, 619; 307/311; 330/59, 278; 340/825.72

[56] References Cited

U.S. PATENT DOCUMENTS

| | | | |
|---|---|---|---|
| 4,317,232 | 2/1982 | Pickett et al. | 307/311 |
| 4,426,662 | 1/1984 | Skerlos et al. | 455/619 |
| 4,489,420 | 12/1984 | Baker et al. | 375/94 |
| 4,713,841 | 12/1987 | Porter et al. | 355/608 |
| 4,718,119 | 1/1988 | Salzer et al. | 330/278 |
| 4,817,208 | 3/1989 | Koch et al. | 330/59 |
| 4,821,338 | 4/1989 | Naruse et al. | 455/619 |

FOREIGN PATENT DOCUMENTS

3136629 7/1983 Fed. Rep. of Germany .

OTHER PUBLICATIONS

Sibley et al., "A Monolithic Common-Collector Front-End Optical Preamplifier", IEEE Journal of Lightwave Technology, vol. LT-3, NO. 1, 2/1985, New York, US pp. 13-15, FIG. 1.

Wurzburg "Vorverstarker. Fur Infraro Temptanoser" Elektrotechnik, vol. 63, No. 19, 10/1981, p. 71.

Philips "Low-Power Remote Control IR Transmitter and Receiver Preamplifiers" Technical Publication 167, 1985, Mar. 22.

Attrill "Infra-Red Remote Control System" Radio & Electron Constructor (G.B.) vol. 34, No. 12, Aug./Sep. 1981.

Primary Examiner—Benedict V. Safourek
Assistant Examiner—Stephen Chin
Attorney, Agent, or Firm—Bernard Franzblau

[57] ABSTRACT

A receiver for use in a remote control system in which clock pulse-modulated information pulses are transmitted in a wireless mode to the receiver. The receiver is intended for use in hearing aids energized with supply voltages of approximately 1 V. The receiver includes a receiving device (1) for the conversion of the wirelessly transmitted information pulses into an electric signal and a cascade arrangement of first and second selective amplifier circuits (2) and (4), each of which have their highest gain factor at a frequency which is approximately equal to the frequency of the clock pulses. This cascade arrangement is connected to the output of the receiver device and supplies a first output signal to a mean value detector (5) which produces a rough version of the information pulses, which in turn are shaped in a pulse shaper (6).

17 Claims, 3 Drawing Sheets

RECEIVER FOR USE IN A REMOTE CONTROL SYSTEM

BACKGROUND OF THE INVENTION

(1) Field of the Invention

This invention generally relates to a remote control system in which pulse sequences which serve as commands are transmitted in a wireless mode, after modulation on an appropriate carrier signal, to one or a plurality of receivers. The transmitter usually forms part of a hand-held unit controllable by a user while the receiver forms part of the apparatus to be controlled, for example an audio set, a video set or as occurs to an ever increasing extent at present, a hearing aid.

The invention particularly relates to such a receiver.

In the following description the remote control system will be abbreviated to RC-systems, the transmitter used therein to RC-transmitter and the receiver to RC-receiver.

(2) Description of the Prior Art

In a remote control system the RC-transmitter includes a message generator which in response to a relevant request by the user supplies a message which consists of a plurality of clock pulse-modulated information pulses. For the transmission of this message to the RC-receiver, an infrared modulation circuit is nowadays usually provided, which includes an infrared LED whose radiated infrared light is modulated by the modulated pulses in the pulse train.

The RC-receiver then includes an infrared photodiode which converts the received infrared light into an electric signal. This signal is applied to a signal processing circuit for generating the original message.

Embodiments of said RC-transmitters and RC-receivers are extensively described in the reference. The RC-receivers described there comprise a cascade arrangement of an input circuit, a modulation circuit, a pulse shaper and an output circuit. The input circuit receives the output signal of the photodiode and includes an input resonant circuit which is tuned to a frequency which corresponds to the clock pulse frequency (38 kHz here). In addition, this input circuit includes an amplifier circuit in the form of a differential amplifier which amplifies the output signal of the input resonant circuit and applies it to the demodulation circuit. This input circuit acts as a selective amplifier circuit which prevents the proper operation of the RC-receiver from being disturbed by other types of light sources which also transmit infrared light, such as the sun, incandescent lamps etc. So as to still further suppress the disadvantageous influence of these light sources, the demodulator circuit is provided with a demodulation resonant circuit which is also tuned to said clock pulse frequency.

Of this prior art infrared RC-receivers the amplifier circuit, the demodulation circuit, the pulse shaper, the output circuit and a still further number of circuits are jointly designed as one integrated circuit. However, in order to obtain the required selectivity, both the input resonant circuit and the demodulation resonant circuit are designed as discrete components, such as capacitors and, more specifically inductances. As a result thereof, the complete RC-receiver is too big to be accommodated in very small housings, such as, for example, in hearing aids. This problem can be obviated to a very high extent by the use of gyrators by means of which these discrete components can be translated to integratable circuitry. This would indeed solve the problem of bulk to a very great extent, but it has an adverse effect on the ever increasing demand for integrated circuits operating at a low voltage in the order of magnitude of 1.2 V. By way of comparison it should be noted that the RC-receiver described in the reference operates at an approximately 5 V supply voltage. For those RC-receivers this is however no problem since they will usually form part of an apparatus which derives its supply voltage from the mains supply.

OBJECT AND SUMMARY OF THE INVENTION

An object of the invention is to provide a RC receiver which on the one hand occupies less volume than the prior art RC receiver and in addition requires a lower supply voltage.

According to the invention:

the input circuit is constituted by a cascade arrangement of a first and a second selective amplifier circuit receiving the output signal from the photo-diode and each having their highest gain factor at a frequency which is equal to the frequency at which the clock pulses occur; and the demodulation circuit is formed by a mean value detector.

More specifically, the first selective amplifier circuit is constituted by an operational amplifier which receives the output signal of the photo-diode via a first filter circuit at a first input, this first input also being connected via a second filter circuit to the output of the operational amplifier, the output further being connected to the second input of the operational amplifier via a first resistance network and this second input being connected to a reference source via a further resistance network.

Since now the first and second filter circuits both can be assembled from resistors and capacitors, this first selective amplifier circuit can be fully designed in integrated form.

The second selective amplifier circuit is more specifically formed by an amplifier which now has a finite gain and a first input of which is connected via a resistance network to the output of the first selective amplifier circuit and via a capacitive network to a reference source. The output of this amplifier is coupled directly to the output of the first selective amplifier circuit and capacitively also to said reference source. The second input of the operational amplifier is directly connected to a further reference source.

As this second selective amplifier circuit exclusively includes resistors and capacitors in addition to the amplifier, the second selective amplifier circuit also can be fully produced in integrated circuitry.

The use of said amplifiers in these selective amplifier circuits has the further advantage that the supply voltage can remain low. It need not be more than, for example, approximately 1.2 V.

Because of the use of the second selective amplifier circuit, the demodulation circuit can be in the form of a mean value detector, which detector can also be operated at a supply voltage of approximately 1.2 V. This is in contradistinction to the synchronous demodulator used in the RC-receivers described in the reference, which require a considerably higher supply voltage (5 Volts).

REFERENCE

Low-power remote control IR transmitter and receiver preamplifiers; Philips Electronic Components and Materials; Technical publication 167 dated 22 Mar. 1985.

EXPLANATION OF THE INVENTION

DESCRIPTION OF THE PREFERRED EMBODIMENTS

Message Format

Figure 1:
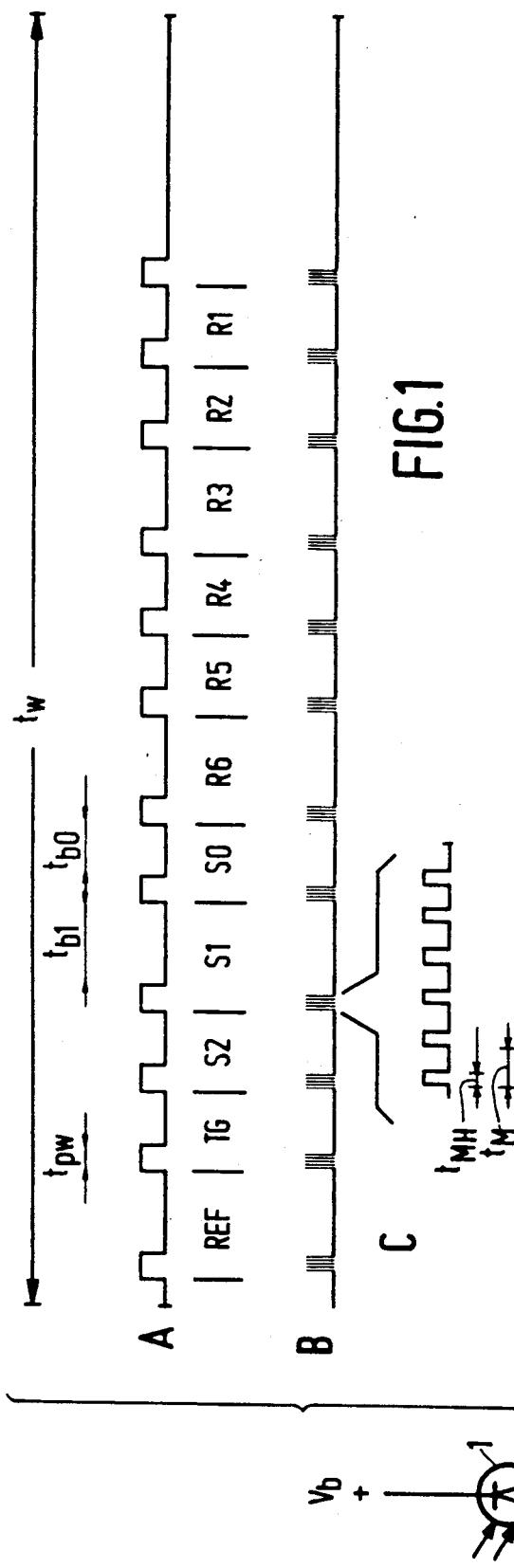
FIG. 1 is a schematic representation of a message as generated by a RC-transmitter for transmission to a RC-receiver.

In FIG. 1 a message is shown schematically at A such as it is to be transmitted from an RC-transmitter to an RC-receiver. This message is assembled in the manner described in the reference and comprises a reference bit REF, a what is commonly referred to as a toggle bit TG, an address word formed by three address bits S0, S1, S2 and a command word formed by six command bits R1, R2, . . . R6. The functions of these bits are extensively described in the reference and are not important for a proper understanding of the invention. Each bit consists of two pulses having a length $t_{pw}$ and an interposed pulse pause. The length of this pulse pause determines the logic value of the relevant bit. More specifically, the bit having the logic value "0" is defined by a pulse pause $t_{b0}$ and a bit having the logic value "1" is defined by a pulse pause $t_{b1}$. As is customary, these pulse pauses are expressed in numbers of clock pulse periods $t_{osc}$ of a reference clock. Some characteristic values are:

| | |
|---|---|
| clock frequency of the reference clock | $f_{osc}$ = 455 kHz |
| clock pulse period of the reference clock | $t_{osc}$ = 32 μs |
| pulse pause of logic "0" | $t_{b0}$ = 2240 $t_{osc}$ |
| pulse pause for logic "1" | $t_{b1}$ = 3392 $t_{osc}$ |
| pulse length | $t_{pw}$ = 64 $t_{osc}$ |
| repetition rate of a message | $t_W$ = 55296 $t_{osc}$ |

The pulses shown at A for transmission to the RC receiver are first modulated on a carrier of approximately 38 kHz. This results in the signal shown schematically at B in FIG. 1, wherein as will be described in greater detail in FIG. 1 at C each original pulse having pulse length $t_{pw}$ has been replaced by a train of six modulation pulses having a period duration $t_M = 12$ $t_{osc} = 26.4$ μs and a pulse width $t_{MH} = 4$ $t_{osc} = 8.8$ μs. For the ultimate transmission of the message these modulation pulses are modulated on an infrared carrier.

The RC-receiver

Figure 2:
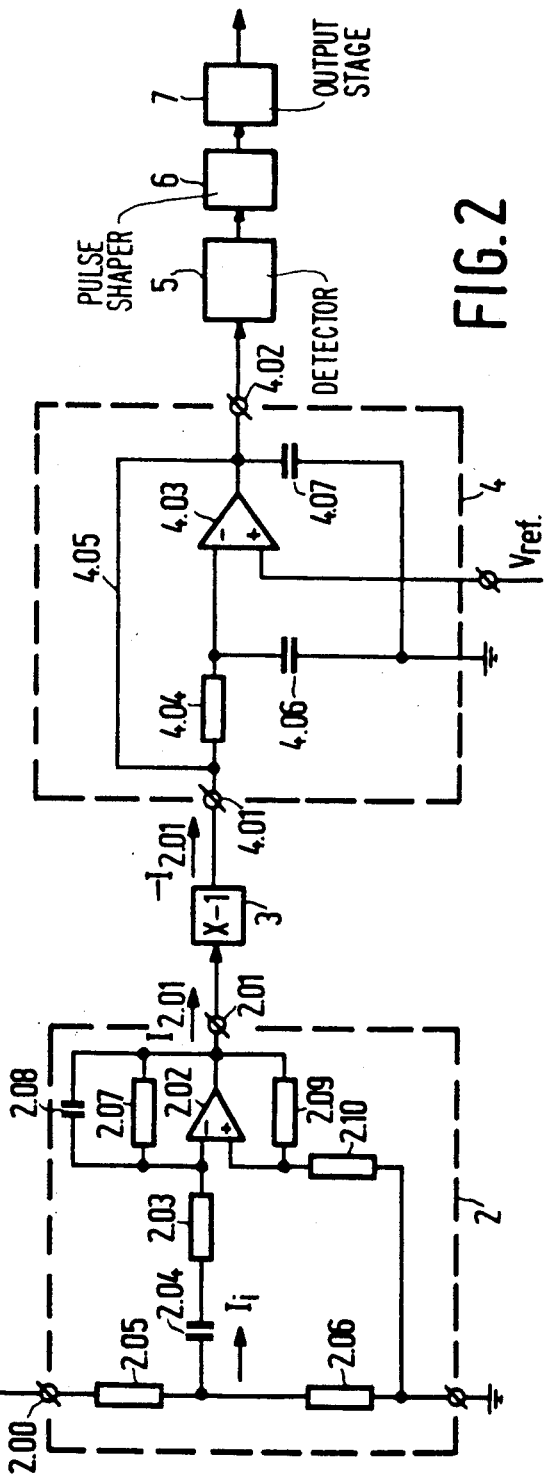
FIG. 2 shows schematically the structure of the RC-receiver according to the invention.

FIG. 2 shows an embodiment of a RC-receiver suitable for the reception of messages of the format as shown in FIG. 1 at B. This RC-receiver includes a photodiode 1 which is connected between a $+V_b$ supply voltage 1.3 Volt and ground and through which a current $I_0$ flows when it is exposed to infrared light. This current is applied to a first selective amplifier circuit 2 via an input 2.00. This amplifier circuit supplies from its output 2.01 an output current $I_{2.01}$ which in the embodiment shown is converted by a polarity inverting stage 3 into a current $-I_{2.01}$ which is applied to a second selective amplifier circuit 4 via an input 4.01. This amplifier circuit supplies from its output 4.02 a signal which represents a rough version of the pulse train shown at B in FIG. 1 and which is applied to a mean value detector 5. This detector supplies a rough version of the original message; i.e. the pulse train shown at A in FIG. 1. This rough version is shaped by the pulse shaper 6 which results in the pulse train shown at A in FIG. 1. In an output stage 7 the pulses of the pulse train are adjusted to a value suitable for processing by further circuits.

In the embodiment shown the central section of the first selective amplifier circuit 2 is formed by an operational amplifier 2.02 whose inverting input $(-)$ is connected to the anode of the photodiode 1 via a cascade arrangement of a resistor 2.03, a capacitor 2.04 and a resistor 2.05. The junction point of resistor 2.05 and capacitor 2.04 is connected to ground potential via a resistor 2.06. The output of the operational amplifier 2.02 is connected to its inverting input $(-)$ via a parallel arrangement of a resistor 2.07 and a capacitor 2.08. This parallel arrangement consequently constitutes a negative feedback. The output of the operational amplifier 2.02 is further connected to ground potential via a series arrangement of two resistors 2.09 and 2.10, the junction point of these two resistors being connected to the non-inverting input $(+)$ of the operational amplifier 2.02.

If the current flowing to capacitor 2.04 is denoted by $I_i$, the capacitance of each of the capacitors 2.04 and 2.08 is denoted by C, the resistance values of each of the resistors 2.03 and 2.07 by R, the resistance value of resistor 2.06 by $R_2$ and the resistance values of the resistors 2.09 and 2.10 are denoted by $(1-B)R_1$ and $BR_1$, respectively, then it can be written for the voltage gain $V_{2.01}/V_i$ of this circuit that:

$$\frac{V_{2.01}}{V_i} = \frac{1}{1-B} \cdot \frac{j\omega RC}{1 + j\omega RC \frac{2-3B}{1-B} - \omega^2 R^2 C^2} \qquad (1)$$

Herein $V_{2.01}$ represents the voltage at the output 2.01. If the current at this output is represented by $I_{2.01}$, then the current gain $I_{2.01}/I_i$ of this circuit can be obtained by multiplying the voltage gain shown in expression (1) by the factor $$\frac{R_2}{R}\left(1 - B + \frac{R}{R_1}\right)\left(1 + j\omega RC \frac{1-B}{1-B+\frac{R}{R_1}}\right) \qquad (2)$$

Figure 3:
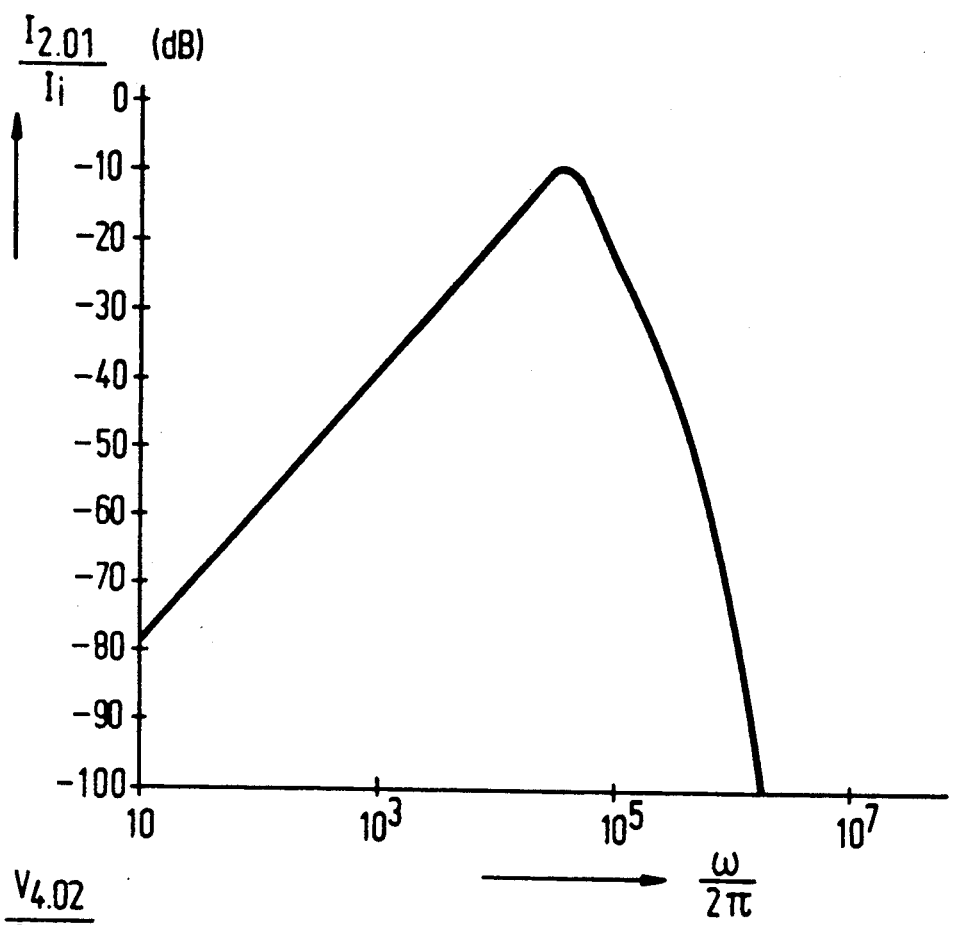
FIG. 3 shows the current transfer function of the first selective amplifier circuit.

The relation measured between the absolute value of this current gain on the one hand and $\omega$ on the other hand is shown graphically in FIG. 3 for the case in which $B = \frac{1}{2}$.

Since the pulses of the message consist of short pulse trains within which the pulses occur at a rate of 38 kHz, the resonant frequency of this first selective amplifier circuit is chosen to be equal to 38 kHz. This is realised by assigning the following values to the capacitors and resistors $$C = 44 \, pF$$

$$R = 100 \, k\Omega$$

$$B = \tfrac{1}{2}$$

$$R_1 = 200 \, k\Omega$$

The central section of the second selective amplifier circuit 4 is formed by an amplifier 4.03 having a finite gain factor, or, which is the same, with finite slope S. As is known, the slope of an amplifier is the ratio between its output current and its input current. More specifically the output current $-I_{2.01}$ of the polarity inverting stage 3 is applied to the inverting input (−) of amplifier 4.03 via a resistor 4.04 and also to its output via a conductor 4.05. The inverting input (−) is further connected to ground potential via a capacitor 4.06 and the output is connected to ground potential via a capacitor 4.07. The non-inverting input (+) of amplifier 4.03 receives a reference voltage $V_{ref}$.

If now the voltage at the output 4.02 of this second selective amplifier circuit is denoted by $V_{4.02}$, the current applied to its input 4.01 by $I_{4.01}$ ($= -I_{2.01}$), the resistance value of resistor 4.04 by $R_4$, the capacitances of capacitors 4.06 and 4.07 by $C$ and $C_p$, respectively, then it holds that:

$$\frac{V_{4.02}}{I_{4.01}} = \frac{1}{S} \cdot \frac{1 + j\omega RC}{1 + j\omega \frac{C + C_p}{S} - \omega^2 RC \frac{C_p}{S}} \tag{3}$$

Figure 4:
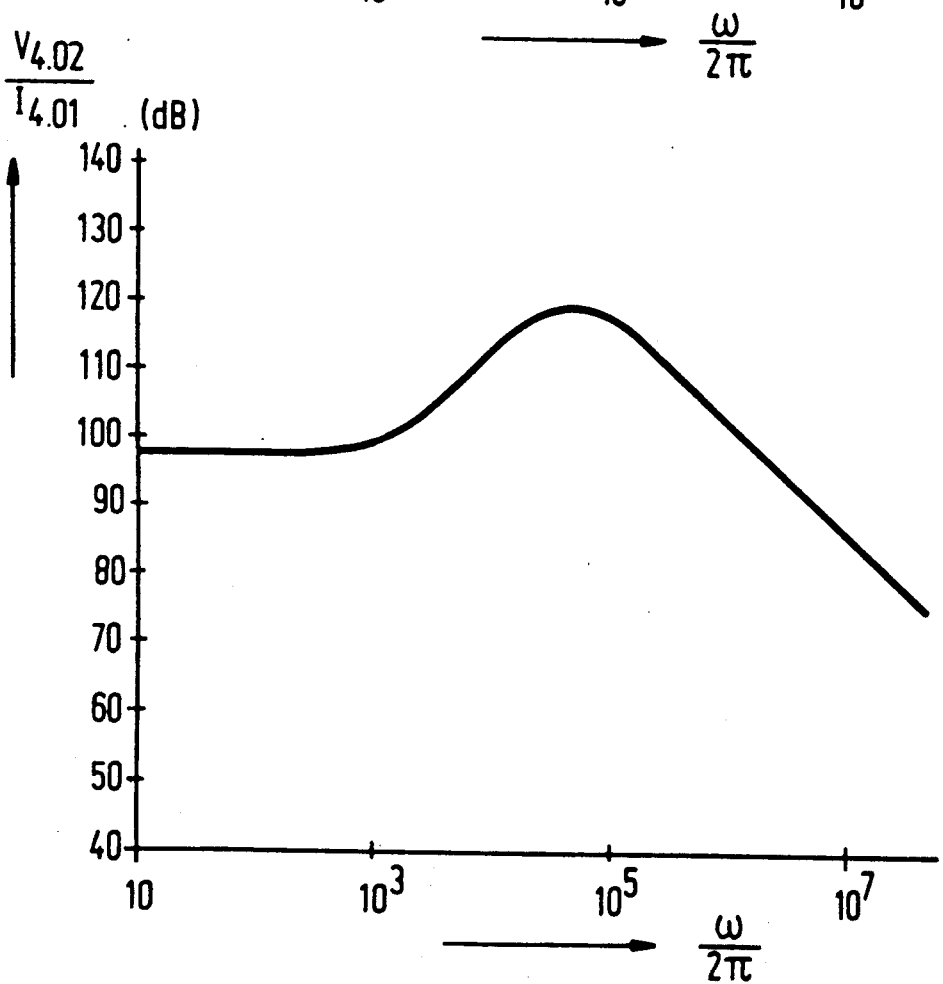
FIG. 4 shows the impedance-frequency characteristic of the second selective amplifier circuit.

The relation measured between the absolute value of the ratio $V_{4.02}/I_{4.01}$ and $\omega$ is shown graphically in FIG. 4.

The resonant frequency of this second selective amplifier circuit is also chosen to be 38 kHz.

Because of the special structure of the first selective amplifier circuit it is achieved that at relatively large deviations (of, for example 12 kHz) of the resonant frequency not more than approximately 2 dB of additional gain loss occur. This is a very advantageous property of the selective amplifier circuit as in IC's the RC-product may evidence a spread of up to 32% caused by normal variations, which spread now does not result in a gain loss of more than 2 dB.

Figure 5:
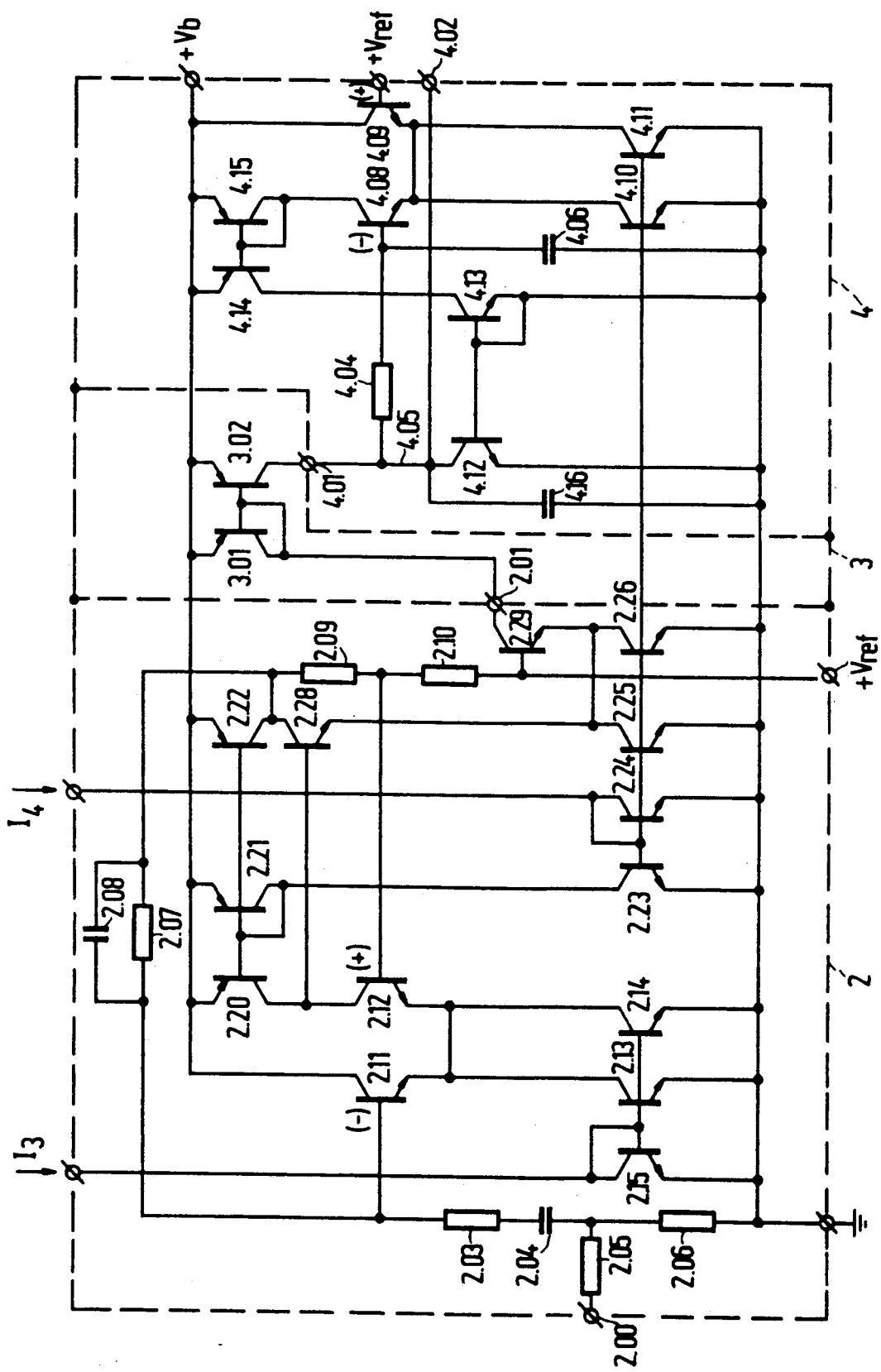
FIG. 5 shows in detail the structure of the two selective amplifier circuits.

The integratable structure of the first and second selective amplifier circuits 2 and 4, respectively, as well as the polarity inverting circuit 3 are shown in detail in FIG. 5. In this FIG. 5 elements corresponding to those in FIG. 2 are given the same reference numerals as in FIG. 2. More specifically, in the first selective amplifier circuit 2 the operational amplifier (2.02) is formed by the transistors 2.11, 2.12, 2.28 and 2.29. The base of transistor 2.11 forms the inverting input (−) of this operational amplifier and the base of transistor 2.12 forms the non-inverting input (+). The emitters of these transistors are connected to a current source circuit formed by the transistors 2.13 and 2.14 which together with a further transistor 2.15 form a current mirror circuit which receives a 0.8 μA current $I_3$ from an external source. The base of transistor 2.11 (that is to say the inverting input of the operational amplifier) is connected via resistor 2.03, capacitor 2.04 and resistor 2.05 to the input 2.00 to which the photodiode is connected. The junction point of capacitor 2.04 and resistor 2.05 is connected to ground potential via resistor 2.06. The base of transistor 2.11 is also connected via the parallel arrangement of the resistor 2.07 and capacitor 2.08 to the collector of transistor 2.28 (being the non-inverting output of the operational amplifier). The collector of transistor 2.28 is further connected by means of resistor 2.09 to the base of transistor 2.12 (being the non-inverting input (+) of the operational amplifier). This base is additionally connected via resistor 2.10 to an input to which an external 800 mV reference voltage source $V_{ref}$ is connected. The collector of transistor 2.11 receives a supply voltage $V_b$ of approximately 1 V from an external voltage source. A current source constituted by a current mirror circuit formed by the transistor 2.20, 2.21, 2.22 is incorporated in the collector of transistor 2.12. This current mirror circuit itself is connected to a further current mirror circuit formed by the transistors 2.23, 2.24, 2.25 and 2.26 which receives a current $I_4$ of also approximately 0.8 μA from an external source. The collector of transistor 2.12 is connected to the base of a transistor 2.28 which is arranged between the transistors 2.22 and 2.25. The inverting output of this first selective amplifier circuit is formed by the collector of a transistor 2.29 whose base is connected in the manner shown to one of the poles of resistor 2.10 and whose emitter is connected to the current sources 2.25 and 2.26.

The polarity inverting circuit 3, which in this embodiment is constituted by a current mirror circuit formed by the transistors 3.01 and 3.02, is connected to the collector of this transistor 2.29.

The second selective amplifier circuit 4 includes the amplifier (4.03) which is comprised of the transistors 4.08 and 4.09. The emitters of these transistors 4.08 and 4.09 are connected to a current source circuit formed by the two transistors 4.10 and 4.11 which together with the transistors 2.26, 2.25, 2.24 and 2.23 form part of a current mirror circuit. The collector current of transistor 4.08 is first mirror-inverted by a current mirror circuit comprised of the transistors 4.14 and 4.15 and thereafter once again by a current mirror circuit comprised of the transistor 4.12 and 4.13 and is thereafter subtracted from the current supplied by the current mirror circuit 3.01, 3.02. The circuit adjusts itself such that the d.c. voltage at the base of 4.08 becomes accurately equal to the voltage at the base of transistor 4.09 ($V_{ref}$). As a result thereof the d.c. voltage at the input 4.01 of this second selective amplifier circuit becomes some mV higher than $V_{ref}$. The inverting input (−) of this amplifier is constituted by the base of transistor 4.08 and is connected via the resistor 4.04 to the output of the current mirror circuit (3.01, 3.02) and also via the capacitor 4.06 to ground potential. The non-inverting input (+) also receives said reference voltage $V_{ref}$. Finally, the output of this second selective amplifier circuit is formed by the collector of transistor 4.12 whose parasitic capacitance performs the function of the capacitor 4.07, together with the capacitance of a capacitor 4.16 which is connected between the collector of transistor 4.12 and ground.

We claim:

1. A receiver for use in a remote control system in which messages are transmitted from a transmitter to the receiver, the messages comprising a plurality of clock pulse-modulated information pulses, the modulated information pulses being modulated for wireless transmission to the receiver on an appropriate carrier signal, the receiver comprising means for receiving the transmitted modulated carrier signal and for converting it into an electric signal; an input circuit receiving said electric signal for conversion into the messages formed by the clock pulse-modulated information pulses; and a demodulation circuit for demodulating modulated information pulses produced by the input circuit; characterized in that the input circuit includes a cascade arrangement of a first and a second selective amplifier circuit each having its highest gain factor at a frequency which is approximately equal to the clock pulse frequency; and the demodulation circuit comprises a mean value detector.

2. A receiver as claimed in claim 1, wherein the first selective amplifier circuit includes an operational amplifier having a first input which receives said electric signal via a first filter circuit, the first input also being connected via a second filter circuit to an output of the operational amplifier, said output being further connected via a first resistance network to a second input of the operational amplifier, which second input is further connected to a reference source via a further resistance network.

3. A receiver as claimed in claim 2, wherein the second selective amplifier circuit comprises an amplifier with a finite gain factor having a first input coupled to an output of the first selective amplifier circuit via a resistance network and to a reference source via a capacitive network, an output of said finite gain amplifier being directly coupled to the output of the first selective amplifier circuit and also capacitively coupled to said reference source, and wherein a second input of the finite gain amplifier is directly connected to a further reference source.

4. A receiver as claimed in claim 1, wherein the second selective amplifier circuit comprises an amplifier with a finite gain factor and having a first input coupled to an output of the first selective amplifier circuit via a resistance network and to a reference source via a capacitive network, an output of said amplifier being directly coupled to the output of the first selective amplifier circuit and also being capacitively coupled to said reference source, and wherein a second input of the amplifier is directly connected to a further reference source.

5. An integrated receiver circuit comprising:
   means for receiving a clock pulse modulated high frequency carrier signal and for converting said signal into an electric signal,
   a first frequency selective amplifier circuit having an input coupled to said receiving and converting means to receive said electric signal and wherein said first amplifier circuit provides a maximum signal gain at a frequency approximately equal to the clock pulse frequency,
   a second frequency selective amplifier circuit connected in cascade with the first selective amplifier circuit and also providing a maximum signal gain at a frequency approximately equal to the clock pulse frequency, and
   a mean value detector connected in cascade with said first and second frequency selective amplifier circuits thereby to demodulate an output signal received from an output of the second frequency selective amplifier circuit.

6. A receiver circuit for processing a high frequency pulse-modulated carrier input signal comprising:
   means responsive to said input signal for converting it into an electric signal,
   a first frequency selective amplifier circuit having an input coupled to said converting means to receive said electric signal, said first amplifier circuit including frequency selective means for providing a maximum signal gain at a given frequency determined by a frequency component of the input signal,
   a second frequency selective amplifier circuit having an input coupled to an output of the first amplifier circuit, said second amplifier circuit including frequency selective means for providing a maximum signal gain at approximately said given frequency of the first amplifier circuit, and
   a mean value detector having an input coupled to an output of the second frequency selective amplifier circuit and an output which supplies a demodulated data signal.

7. A receiver circuit as claimed in claim 6 wherein the first frequency selective amplifier circuit comprises;
   an operational amplifier having a first input coupled to the input of the first amplifier circuit via a first RC circuit and a second input coupled to a source of reference voltage via a first resistance network, an output of said operational amplifier being connected via a second RC circuit to its first input and via a second resistance network to its second input.

8. A receiver circuit as claimed in claim 7 wherein the electrical parameters of said first and second RC circuits and said first and second resistance networks are chosen to provide said maximum signal gain at said given frequency.

9. A receiver circuit as claimed in claim 7 wherein the second frequency selective amplifier circuit comprises;
   an amplifier having a finite gain factor, said amplifier comprising a first input coupled to the output of the first frequency selective amplifier circuit via a third resistance network and to a source of reference voltage via a capacitive network, a second input coupled to a further source of reference voltage, and an output coupled to the output of the first frequency selective amplifier circuit and via a capacitor to said source of reference voltage.

10. A receiver circuit as claimed in claim 9 wherein the electrical parameters of the third resistance network, the capacitive network and said capacitor are chosen to provide said maximum signal gain at approximately said given frequency.

11. A receiver circuit as claimed in claim 6 wherein said first and second amplifier circuits are substantially devoid of inductance elements and said input of the first frequency selective amplifier circuit is coupled to said signal converting means via a current path also substantially devoid of inductance elements.

12. A receiver circuit as claimed in claim 6 wherein said converting means comprises a photodiode coupled to a source of DC supply voltage of approximately 1.3 volts.

13. A receiver circuit as claimed in claim 6 wherein said frequency selective means of the first amplifier circuit includes at least one RC circuit devoid of inductance elements and said frequency selective means of the second amplifier circuit includes at least one other RC circuit devoid of inductance elements.

14. A receiver circuit as claimed in claim 6 wherein said high frequency pulse modulated carrier input signal comprises radiated infrared light and said signal converting means includes an infrared photodiode electrically coupled to a low voltage source of DC voltage.

15. A receiver circuit as claimed in claim 14 wherein said first frequency selective amplifier circuit comprises;
an operational amplifier having a first input coupled to the input of the first amplifier circuit via a series RC circuit and a second input coupled to a source of reference voltage via a first resistance network, an output of said operational amplifier being connected via a parallel RC circuit to its first input and via a second resistance network to its second input.

16. A receiver circuit as claimed in claim 14 wherein the second frequency selective amplifier circuit comprises;
an amplifier having a finite gain factor, said amplifier comprising a first input coupled to the output of the first frequency selective amplifier circuit via a resistance network and to a source of reference voltage via a capacitive network, a second input coupled to a further source of reference voltage, and an output coupled to the output of the first frequency selective amplifier circuit via a circuit that bypasses said resistance network and further coupled via a capacitor to said source of reference voltage.

17. A receiver circuit a claimed in claim 6 wherein said mean value detector is coupled to said first frequency selective amplifier circuit only via said second frequency selective amplifier circuit.

* * * * *